US011629794B2

(12) United States Patent
Bujewicz et al.

(10) Patent No.: US 11,629,794 B2
(45) Date of Patent: Apr. 18, 2023

(54) SERVO VALVE ASSEMBLY

(71) Applicant: Hamilton Sundstrand Corporation, Charlotte, NC (US)

(72) Inventors: Maciej Bujewicz, Wroclaw (PL); Marcin Korczynski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 220 days.

(21) Appl. No.: 17/068,892

(22) Filed: Oct. 13, 2020

(65) Prior Publication Data
US 2021/0115950 A1 Apr. 22, 2021

(30) Foreign Application Priority Data
Oct. 19, 2019 (EP) .................................. 19461592

(51) Int. Cl.
F16K 31/06 (2006.01)
F15B 13/043 (2006.01)
F16K 11/085 (2006.01)

(52) U.S. Cl.
CPC ...... F16K 31/0682 (2013.01); F15B 13/0438 (2013.01); F16K 11/0853 (2013.01); F15B 2211/426 (2013.01)

(58) Field of Classification Search
CPC ......... Y10T 137/86598; F16K 31/0682; F15B 13/0438
See application file for complete search history.

(56) References Cited

U.S. PATENT DOCUMENTS 2,962,611 A * 11/1960 Atchley .............. F16K 31/0682
310/38
3,209,782 A * 10/1965 Wolpin ............... F15B 13/0438
137/625.69
(Continued)

FOREIGN PATENT DOCUMENTS

CS 246744 B1 11/1986
DE 3630200 A1 3/1988
(Continued)

OTHER PUBLICATIONS

Abstract of DE 3630200A1, one page.
(Continued)

Primary Examiner — Michael R Reid
(74) Attorney, Agent, or Firm — Cantor Colburn LLP

(57) ABSTRACT

A servo valve assembly includes a first nozzle opposing a second nozzle and a shaft positioned in the gap between the first and second nozzles. The first and second nozzles are spaced apart by a gap and each nozzle has an outlet opening. The shaft defines a diameter (D) and a circumferential surface and is rotatable about an axis of rotation (R-R). The shaft defines first and second reduced radial portions around its circumferential surface, and the first and second reduced radial portions are in fluid communication with the first and second nozzle outlet openings, respectively. The shaft is configured to rotate between a first position where the first nozzle outlet opening is more occluded by the shaft circumferential surface than the second nozzle outlet opening, and a second position where the first nozzle outlet opening is less occluded by the shaft circumferential surface than the second nozzle outlet opening.

12 Claims, 9 Drawing Sheets

(56) References Cited

U.S. PATENT DOCUMENTS

| | | | | |
|---|---|---|---|---|
| 3,323,090 | A * | 5/1967 | O'Brien | H01F 7/14 277/584 |
| 3,455,330 | A * | 7/1969 | Williams | F15B 5/003 137/625.62 |
| 4,333,498 | A * | 6/1982 | Huling | F15B 13/0438 137/625.62 |
| 5,024,247 | A * | 6/1991 | Lembke | F15B 13/0438 335/229 |
| 5,070,898 | A * | 12/1991 | Jagodzinski | F15B 13/0438 137/83 |
| 5,184,645 | A * | 2/1993 | Boerschig | F15C 3/14 137/625.25 |
| 9,377,122 | B2 * | 6/2016 | Druhan | H02K 26/00 |
| 10,197,178 | B2 * | 2/2019 | Rateick | H01F 7/14 |
| 2016/0049230 | A1 * | 2/2016 | Cichon | F16K 31/0644 335/229 |
| 2016/0160886 | A1 * | 6/2016 | Baker | F15B 13/0438 251/30.01 |
| 2017/0254432 | A1 * | 9/2017 | Rateick | F15B 13/0438 |
| 2018/0274616 | A1 * | 9/2018 | Cis | F16F 1/14 |

FOREIGN PATENT DOCUMENTS

| | | |
|---|---|---|
| EP | 3217020 A1 | 9/2017 |
| JP | S511695 U | 1/1976 |
| JP | 2003021110 A | 1/2003 |
| RU | 2093715 C1 | 10/1997 |

OTHER PUBLICATIONS

Abstract of JP2003021110A, 1 page.
Extended European Search Report for International Application No. 19461592.8 dated Apr. 15, 2020, 8 pages.

\* cited by examiner

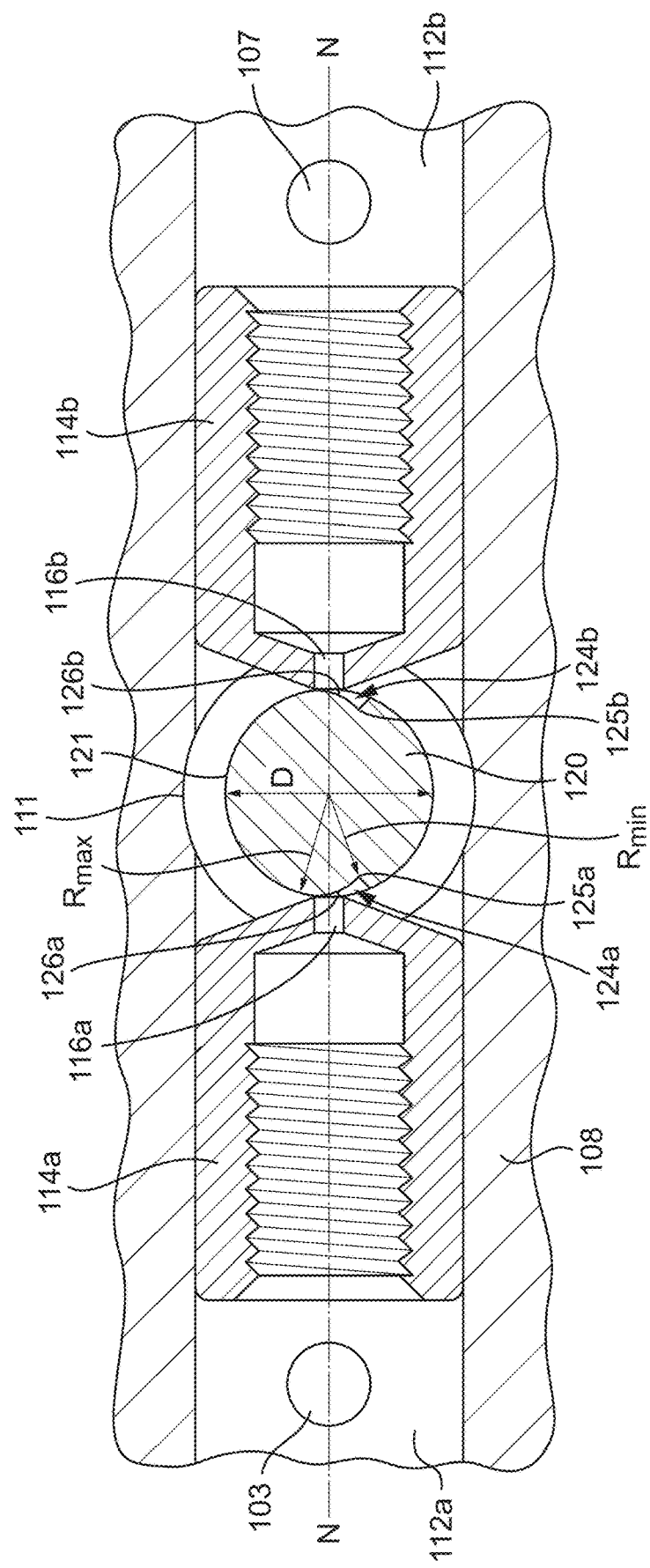

SERVO VALVE ASSEMBLY

FOREIGN PRIORITY

This application claims priority to European Patent Application No. 19461592.8 filed Oct. 19, 2019, the entire contents of which is incorporated herein by reference.

TECHNICAL FIELD

This disclosure relates generally to servo valve assembly. This disclosure also relates to a servo valve comprising the servo valve assembly and a method of controlling the servo valve assembly.

BACKGROUND

Servo valves are generally used when accurate position control is required, such as, for example, control of a primary flight surface. Servo valves can be used to control pneumatic or hydraulic actuators or motors. They are common in industries which include, but are not limited to, automotive systems, aircraft and the space industry.

A known type of servo valve has a flapper and nozzle arrangement.

FIG. 1 shows generally a known arrangement of a flapper and nozzle servo valve 20. Servo valve 20 comprises a flapper 201 disposed in a flapper cavity 208c, a pair of nozzles 206 disposed in a nozzle housing 208, and an electromagnet 205 surrounding an armature 202. The armature 202 has opposed tips 202a, 202b which protrude through gaps 205b in a housing 205a surrounding the electromagnet 205, and which are arranged to leave spaces 203a, 203b, 203c, 203d between the armature 202 and the housing 205a.

The electromagnet 205 is connected to an electrical input (not shown) and the armature 202 is connected in a perpendicular manner to the flapper 201, or is an integral part of the flapper 201—the integral part being perpendicular to the flapper 201. The electromagnet 205 includes coils (not shown) that surround the armature 202 and a set of permanent magnets (not shown) that surround the coils. When a current is applied to the coils from the electrical input, magnetic flux acting on the ends of the armature 202 is developed. The direction of the magnetic flux (force) depends on the sign (direction) of the current. The magnetic flux will cause the armature tips 202a, 202b to be attracted to the electromagnet 205 (current direction determines which magnetic pole is attracting and which one is repelling) thus varying the size of the spaces 203a, 203b, 203c, 203d. This magnetic force creates an applied torque on the flapper 201, which is proportional to applied current. The flapper 201 rotates and interacts with the nozzles 206.

Nozzles 206 are housed within a respective nozzle cavity 210 in the housing 208, and comprise a fluid outlet 206a and fluid inlet 206b. Housing 208 also has a port 208a, which allows communication of fluid to the nozzles 206. The flapper 201 comprises a blocking element 201a at an end thereof which interacts with fluid outlets 206a of nozzles 206 to provide metering of fluid from the fluid outlets 206a to a fluid port 208b in the housing 208. Fluid port 208b in turn allows communication of fluid pressure downstream to a spool valve and actuator arrangement (not shown). The positioning of the flapper 201 between nozzles 206 (controlled by the movement of the armature 202 via electromagnet 205) will control the amount of fluid pressure communicated to the spool valve and actuator arrangement (not shown), which can be used to control actuator movement.

Although the flapper and nozzle type of servo valve arrangement shown in FIG. 1 can be effective at controlling an actuator, it has been found that limitations nevertheless exist. For example: in order to provide the correct limitations on flapper 201 and armature 202 movement, the spaces 203a, 203b, 203c, 203d must be calibrated to very tight tolerances, as must the spacing of the nozzles 206 from the flapper 201. Moreover, there is also a general desire to reduce servo valve weight and simplify its manufacture, construction and operation, as well as improve the operational pressures and frequencies that may be realised with such servo valve arrangements.

The present disclosure aims to provide a servo valve assembly that improves on the above, by replacing the flapper and nozzle arrangement with a different construction.

SUMMARY

From one aspect, the present disclosure provides a servo valve assembly. The servo valve assembly comprises a first nozzle opposing a second nozzle spaced apart by a gap and a shaft positioned in the gap between the first and second nozzles. Each nozzle has an outlet opening and the shaft defines a diameter and a circumferential surface and is rotatable about an axis of rotation. The shaft defines first and second reduced radial portions around its circumferential surface, and the first and second reduced radial portions are in fluid communication with the first and second nozzle outlet openings, respectively. The shaft is configured to rotate between a first position where the first nozzle outlet opening is more occluded by the shaft circumferential surface than the second nozzle outlet opening, and a second position where the first nozzle outlet opening is less occluded by the shaft circumferential surface than the second nozzle outlet opening.

In one example, the first and second reduced radial portions each comprise a groove in the circumferential surface of the shaft.

In a further example of the above, the first and second reduced radial portions each comprise a curved surface of continuously decreasing radius that terminates at the groove.

In a further example of any of the above, the axis of rotation is perpendicular to a central axis of each nozzle outlet opening.

In a further example of any of the above, in the first position, the first nozzle outlet opening is fully occluded by the shaft circumferential surface such that the first reduced radial portion is prevented from being in fluid communication therewith, and the second nozzle outlet opening is fully open such that none of the second nozzle outlet opening is occluded by the shaft circumferential surface. In the second position, the second nozzle outlet opening is fully occluded by the shaft circumferential surface such that the second reduced radial portion is prevented from being in fluid communication therewith, and the first nozzle outlet opening is fully open such that none of the first nozzle outlet opening is occluded by the shaft circumferential surface.

In a further example of any of the above, the servo valve assembly further comprises a biasing member configured to provide a biasing force that opposes rotation of the shaft towards a third position where the first nozzle outlet opening and the second nozzle outlet opening are equally occluded by the shaft circumferential surface.

In a further example of the above, the shaft further comprises a slot extending along its diameter, and the biasing member is received in the slot to apply the biasing force to the shaft.

In a further example of the above, the biasing member comprising a pair of S-shaped springs that are fixed in the slot.

In a further example of any of the above, the servo valve assembly further comprises a coil arranged around at least a portion of the shaft. The coil and the shaft are configured to generate an electromagnetic force that rotates the shaft when the coil is energised with an electric current.

In a further example of the above, the shaft further comprises a driving member extending perpendicular to the axis of rotation and configured to interact with the coil to generate the electromagnetic force.

In a further example of the above, the driving member includes a permanent magnet attached thereto to interact with the coil to generate the electromagnetic force.

In a further example of the above, the coil comprises a pair of coils on opposite sides across the diameter of the shaft.

From another aspect, the present disclosure provides a servo valve comprises the servo valve assembly of any of the above examples.

From yet another aspect, the present disclosure provides a method of controlling the servo valve assembly of any of the above examples. The method comprises applying an electric current to the coil to generate an electromagnetic force that rotates the shaft about the axis of rotation in a first rotational direction towards the first position; reversing the polarity of the electric current; and applying the reversed polarity electric current to the coil to generate an electromagnetic force that rotates the shaft about the axis of rotation in a second rotational direction opposite the first rotational direction towards the second position.

BRIEF DESCRIPTION OF THE DRAWINGS

FIG. 5A shows a cross-sectional view of the servo valve assembly of FIG. 4 along line 2-2.

DETAILED DESCRIPTION

Figure 1:
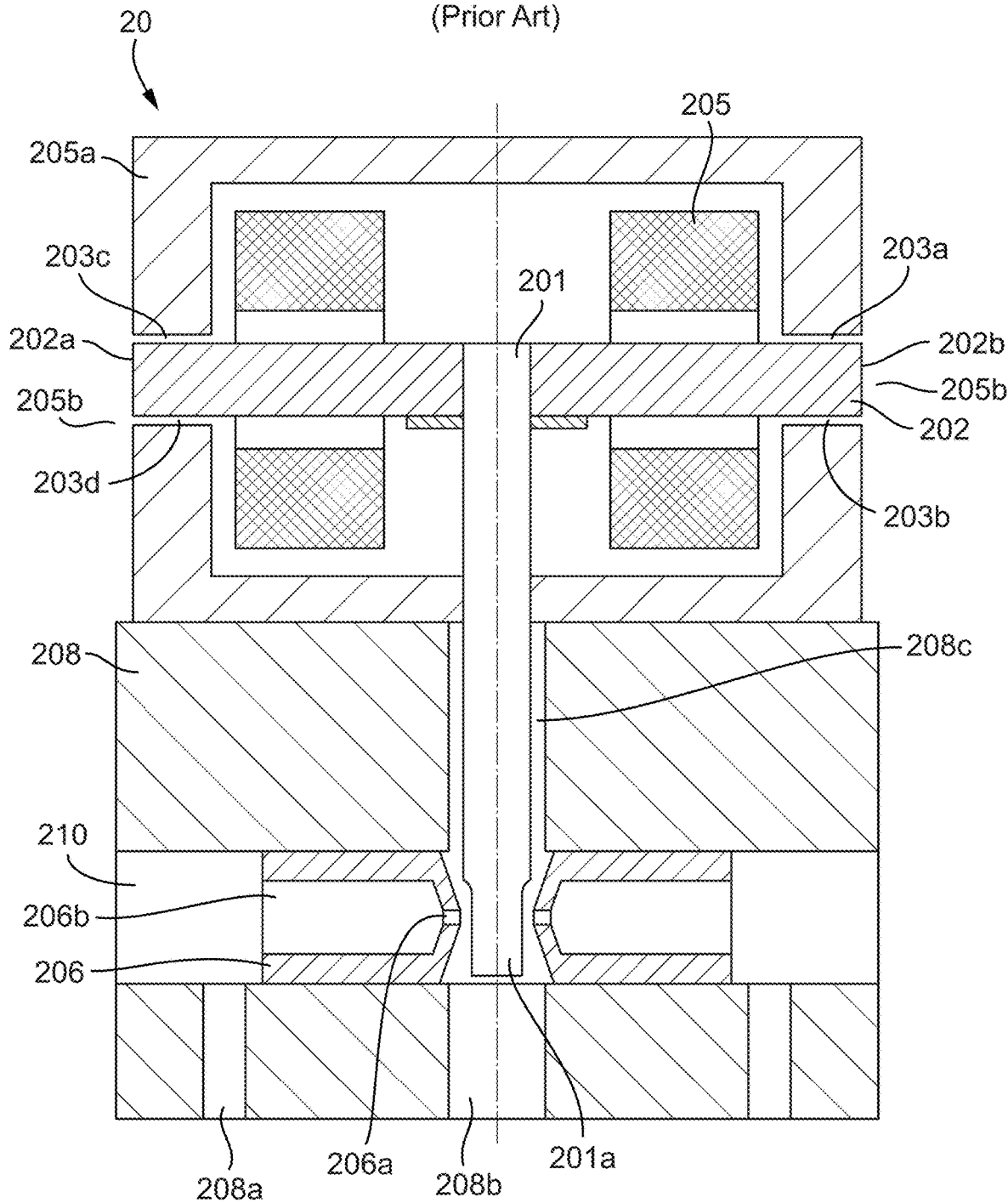
FIG. 1 shows a known arrangement of a flapper and nozzle servo valve.
Figure 2A:
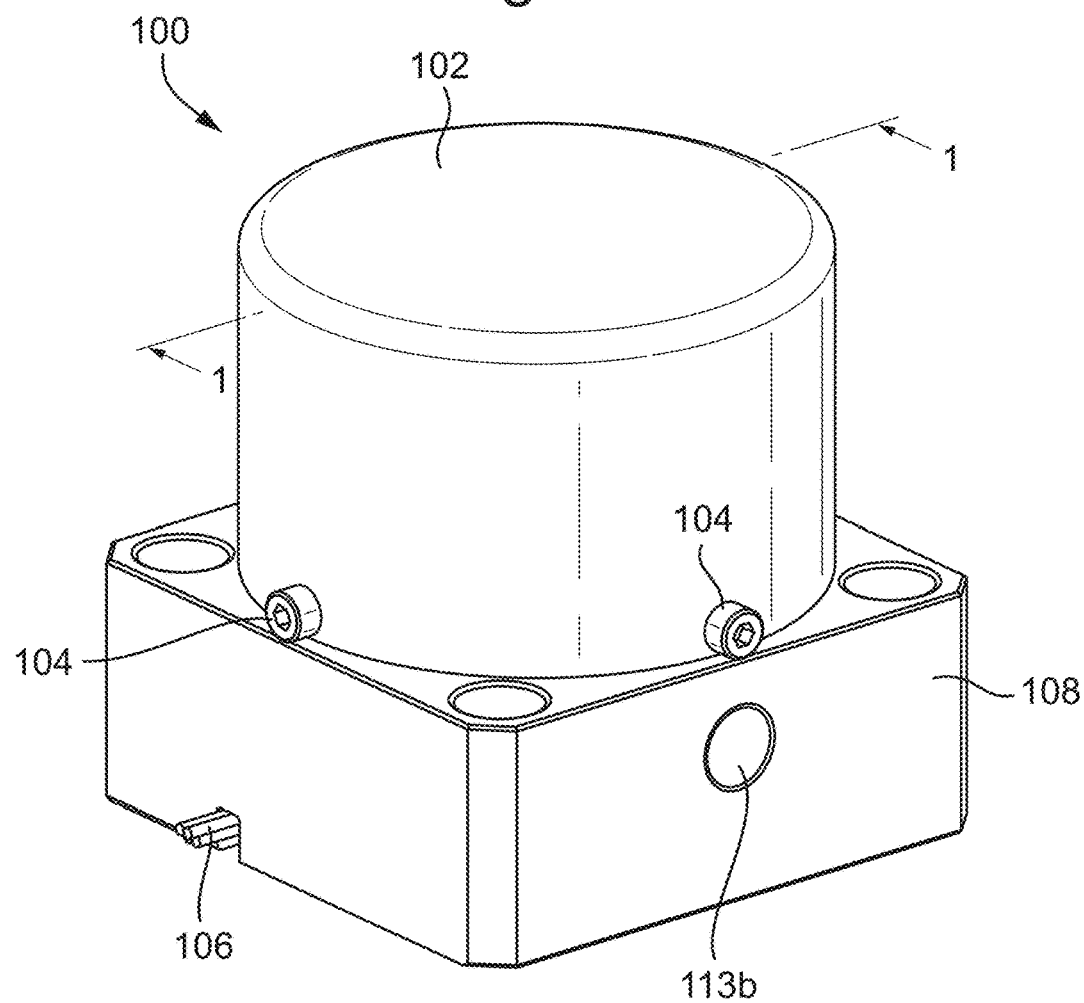
FIG. 2A shows an example of a servo valve assembly in accordance with the present disclosure from the exterior.

With reference to FIGS. 2A-2D, 3 and 4, there is shown an example of a servo valve assembly 100 in accordance with the present disclosure. The depicted servo valve assembly 100 may be suitable for use with either a pneumatic or hydraulic system, and thus, may be used in conjunction with any suitable pressurised fluid e.g. pressurised gas, such as air, or a pressurised liquid, e.g. hydraulic fluid or fuel.

The servo valve assembly 100 comprises a top cover 102 and a housing 108. The cover 102 is removably attached to a platform 108a of the housing 108 using threaded fasteners 104. However, any other suitable fastening mechanism may be used, removable or otherwise (e.g. rivets, welding etc.). Nonetheless, it will be appreciated that a removable means of fastening the top cover 102 will often be desired to allow easier access to the servo valve assembly 100 for maintenance.

A pin 110 is provided in the base of the housing 108 for connecting the housing 108 to a further downstream component, for example, to a spool valve and actuator arrangement (not shown). Although pin 110 is depicted, any suitable connection means between the housing 108 and a downstream component can be used (e.g. welding), or in an alternative example, the housing 108 may be an integral part of the downstream component (e.g. providing a one-piece servo valve).

The servo valve assembly 100 comprises a first nozzle 114a opposing a second nozzle 114b. The first and second nozzles 114a, 114b are spaced apart by a gap and each nozzle 114a, 114b has an outlet opening 116a, 116b. The outlet openings 116a, 116b define a central nozzle axis N-N. In the depicted example, the first and second nozzle outlet openings 116a, 116b are co-axial with each other, and the gap separating the nozzles 114a, 114b is along the central nozzle axis N-N. However, the nozzles 114a, 114b may not necessarily be co-axial with each other. For instance, the first and second nozzle outlet openings 116a, 116b may define separate central axes N-N that are parallel to each other, but which are offset vertically (e.g. offset perpendicular to the central axes N-N). In this arrangement, the nozzles 114a, 114b are also still spaced apart by a gap that extends along the axes N-N.

The first and second nozzles 114a, 114b are disposed in the housing 108 in respective nozzles cavities 112a, 112b. The nozzle cavities 112a, 112b are sealed from the surroundings/exterior of the housing 108 by plugs 113a, 113b. In the depicted example, the plugs 113a, 113b use an interference fit with inner surfaces of the nozzle cavities 112a, 112b in order to provide a seal. However, any other suitable type of fitment can be used to achieve the same effect (e.g. the plugs 113a, 113b may be threadably received in the inner surfaces of the cavities 112a, 112b and/or may include O-ring seals to provide enhanced sealing between the plugs 113a, 113b and the inner surfaces of the cavities 112a, 112b). As will be appreciated by the skilled person, the plugs 113a, 113b are desirably removably secured to the housing 108, such that they can be removed to allow access to the nozzles 114a, 114b in the cavities 112a, 112b, e.g. for maintenance and calibration of the servo valve assembly 100.

The servo valve assembly 100 comprises a shaft 120 positioned in the gap between the first and second nozzles 114a 114b. The shaft 120 is rotatable about an axis of rotation R-R along which it also extends. The shaft 120 defines a diameter D and a circumferential surface 121. Accordingly, shaft 120 is substantially cylindrical.

At a first axial end of the shaft 120 a spindle 122 of reduced diameter compared to the shaft 120 is defined and at a second, opposing axial end of the shaft 120 a slot 128 is defined. The slot 128 extends along the diameter D of the shaft 120.

The shaft 120 is disposed in a shaft cavity 111 in the housing 108. The shaft 120 is supported in the housing 108 by an O-ring 130 surrounding the shaft 120 disposed in a seal recess 131 in the housing 108, and by the spindle 122 being housed in a spindle recess 123 in the housing 108. In this manner, the shaft 120 is supported to rotate centrally around the axis R-R and remain perpendicular to the nozzle axes N-N when in rotation (i.e. to prevent the shaft 120 wobbling in the shaft cavity 111 during rotation). These support features can allow the shaft 120 to provide more a predictable interaction with the nozzles 114a, 114b and their outlet openings 116a, 116b, as discussed in more detail below. Although the spindle 122 and O-ring 130 being housed in the housing 108 are the depicted support features, any other suitable means for supporting the shaft 120 for rotation in the housing 108 may be provided. The O-ring 130 also provides a sealing effect that isolates the interior of the housing from the second axial end of the shaft 120.

The housing 108 includes a fluid supply port 103, a fluid control port 105 and a fluid return port 107 that are configured to allow communication of pressurised fluid between the servo valve assembly 100 and the downstream component via the nozzles 114a, 114b and the shaft 120. Each port 103, 105, 107 includes a filter screen 103c, 105c, 107c and a screen ring 103b, 105b, 107b (or other suitable means) holding it in place. The filter screens 103c, 105c, 107c allow the filtering out of contaminants from the pressurised fluid during use of the servo valve assembly 100. The supply port 103 and the return port 107 are fluidly connected to respective supply and return passages 103a, 107a that open into the nozzle cavities 112a, 112b and provide fluid communication therebetween. In this manner, the supply passage 103a is configured to deliver pressurised fluid from the supply port 103 to the nozzle 114a in the nozzle cavity 112a, and the return passage 107a is configured to deliver pressurised fluid from the return port 107 to the nozzle 114b in the nozzle cavity 112b. The control port 105 is fluidly connected to two fluid passages 105a, 105a'. The fluid passages 105a, 105a' open into the shaft cavity 111 to provide fluid communication between the shaft cavity 111 and the control port 105. In this manner, the supply passages 105a, 105a' deliver pressurised fluid from the shaft cavity 111 to the control port 105. As is known to the skilled person, the varied delivery of pressurised fluid between the supply, control and return ports 103, 105, 107 can be used to control a downstream component (not shown), e.g. spool valve and/or actuator.

Figure 5B:
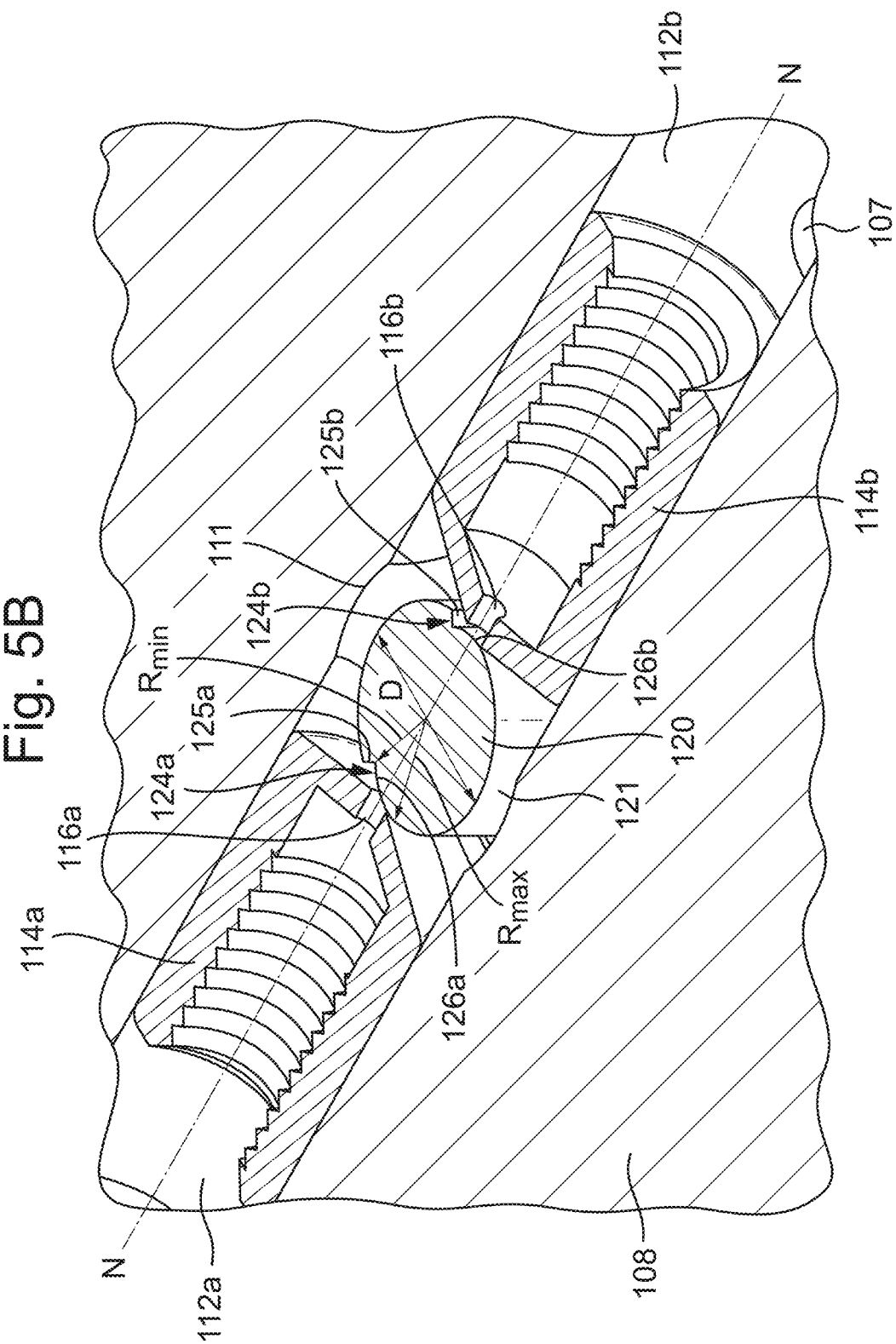
FIG. 5B shows a perspective view of the servo valve assembly of FIG. 5A.

With reference to FIGS. 5A and 5B, the shaft 120 defines first and second reduced radial portions 124a, 124b around its circumferential surface 121. The first and second reduced radial portions 124a, 124b are in fluid communication with the first and second nozzle outlet openings 116a, 116b, respectively. The reduced radial portions 124a, 124b can extend axially along the circumferential surface 121 of the shaft 120 any suitable amount in order to provide a suitable amount of variable fluid communication with the outlet openings 116a, 116b.

The shaft 120 is configured to rotate between a first position where the first nozzle outlet opening 116a is more occluded by the shaft circumferential surface 121 than the second nozzle outlet opening 116b, and a second position where the first nozzle outlet opening 116a is less occluded by the shaft circumferential surface 121 than the second nozzle outlet opening 116b. In this manner, the rotation of the shaft 120 allows the reduced radial portions 124a, 124b to determine the differential amount each outlet opening 116a, 116b is occluded by the shaft 120.

The amount of occlusion of the outlet openings 116a, 116b in this context means the amount of the outlet opening 116a, 116b flow area that is blocked and prevented from fluid communication with the shaft cavity 111 and control port 105 by the circumferential surface 121 of the shaft 120. By selectively occluding different amounts of each outlet opening 116a, 116b using the circumferential surface 121 of the shaft 120, the amount of fluid pressure that is communicated from the supply and return ports 103, 107 via nozzles 114a, 114b to the control port 105 can be varied. In this manner, the rotation of the shaft 120 can be used to control the fluid pressure communicated to a downstream component (not shown) for control thereof.

In some examples, the first position can correspond to a position where the first nozzle outlet opening 116a is fully occluded by the shaft circumferential surface 121 such that the first reduced radial portion 124a is prevented from being in fluid communication with the outlet opening 116a, and the second nozzle outlet opening 116b is fully open such that none of the second nozzle outlet opening 116b is occluded by the shaft circumferential surface 121. In this manner, the first outlet opening 116a (and thus the supply port 103) is prevented from providing any fluid communication with the control port 105, and fluid communication with the control port 105 is only provided via the second nozzle outlet opening 116b (i.e. from the return port 107). Likewise, in some examples, the second position can correspond to a position where the second nozzle outlet opening 116b is fully occluded by the shaft circumferential surface 121 such that the second reduced radial portion 124b is prevented from being in fluid communication with the second outlet opening 116b, and the first nozzle outlet opening 116a is fully open such that none of the first nozzle outlet opening 116a is occluded by the shaft circumferential surface 121. In this manner, the second outlet opening 116b (and thus the return port 107) is prevented from providing any fluid communication with the control port 105, and fluid communication with the control port 105 is only allowed via the first nozzle outlet opening 116a (i.e. from the supply port 103).

Of course, it is to be understood that any suitable amount of occlusion of the outlet openings 116a, 116b can be used to define the first and second positions within the scope of this disclosure. For example, in some examples the full operating window of the associated downstream component (not shown) may be realised without necessarily needing to fully prevent fluid communication from the supply and return ports 103, 107 to control port 105.

The depicted reduced radial portions 124a, 124b define grooves 125a, 125b in the circumferential surface 121 of the shaft 120. The reduced radial portions 124a, 124b also define curved surfaces 126a, 126b of continuously decreasing radius that terminate at the grooves 125a, 125b. In this manner, the grooves 125a, 125b define a minimum radius $R_{min}$ of the shaft 120 and the curved surfaces 126a, 126b define a smooth transition from the 'initial' (or maximum) radius $R_{max}$ of the shaft 120 to this minimum radius $R_{min}$. Such a transition may provide more predictable metering of the relative fluid communication from the outlet openings 116a, 116b to the control port 105 during shaft rotation. The circumferential extent of the curved surfaces 126a, 126b and the minimum radius $R_{min}$ defined by the grooves 125a, 125b can be varied to define the abruptness of the transition. In this manner, these features can be used to define the maximum amount of fluid communication possible from the outlet openings 116a, 116b and the degree of change experienced therein for a given amount of shaft rotation. As will be appreciated, this can be used to calibrate the servo valve assembly 100 for a particular design application.

Although the depicted example features grooves 125a, 125b and curved surfaces 126a, 126b defining the reduced radial portions 124a, 124b, within the scope of this disclosure, any other suitable geometry of reduced radial portions 124a, 124b that would be apparent to the skilled person to achieve the same effect may be used.

With reference to FIGS. 2B-2D, 3 and 4, a pair of coils 140a, 140b are each arranged around a circumferential portion of the shaft 120. The depicted coils 140a, 140b are spaced apart on opposite sides across the diameter D of the shaft 120, and are fixed to the platform 108a radially outboard of the holders 134a, 134b. The coils 140a, 140b include a coil winding 142a, 142b encased in a protective jacket material 143a, 143b. The coils 140a, 140b may also feature a soft magnetic core (not shown) surrounded by the windings 140a, 140b, if desired.

The depicted coils 140a, 140b include wired connectors 141a, 141b that are in electrical communication with the windings 142a, 142b. The connectors 141a, 141b are operatively connected to an electrical supply (not shown) via electrical supply wiring 106 that passes through the housing 108, to allow the energisation of the coils 140a, 140b by an electrical current. The supply wiring 106 is secured in the housing by a seal plug 106a.

The coils 140a, 140b and the shaft 120 are configured to generate an electromagnetic force that rotates the shaft 120 around the axis of rotation R-R between the first and second positions when the coils 140a, 140b are energised with an electric current. In other words, the coils 140a, 140b are solenoid coils that produce a magnetic force in response to energisation from the electrical current, and the shaft 120 is configured to respond to the electrically generated magnetic force, either by attraction or repulsion, to rotate it around the axis R-R.

In the depicted example, the shaft 120 comprises a driving member 144 extending perpendicular to the axis of rotation R-R that is configured to interact with the coil 140a, 140b to generate the electromagnetic force and drive rotation of the shaft 120.

The driving member 144 is a substantially I-shaped member defining two opposing T-shaped ends 144a, 144b that connect to a central aperture 144c. The central aperture 144c is sized to receive the shaft 120 and fixes the driving member 144 to the shaft 120 for rotation therewith. One suitable way of achieving this is to provide the central aperture 144c with a smaller diameter than the shaft diameter D and use an interference fit between the two to hold the driving member 144 around the shaft 120 in use. However, any other suitable way of achieving this may be used.

Permanent magnets 146a, 146b are attached to each T-shaped end 144a, 144b using screws 145a, 145b. The magnetic field from the permanent magnets 146a, 146b will interact with the magnetic fields generated by energisation of the coils 140a, 140b to drive rotation of the driving member 144 and the shaft 120.

The driving member 144 is fixed for rotation relative to the housing 108 by a washer 132 disposed between the platform 108a and the driving member 144 (through which the shaft 120 passes). In order to minimise friction acting against the rotation of the driving member 144 the washer 132 may be made of a low friction material, and for example, may be a copper washer.

Changing the amount and/or polarity of the electrical current used to energise the coils 140a, 140b is used to change the amount and direction of shaft rotation about the axis of rotation R-R. In this manner, energisation of the coils 140a, 140b can be used to vary the amount of occlusion of each of the outlet openings 116a, 116b by the circumferential surface 121 of the shaft (as discussed above).

As will be appreciated from the above, although two coils 140a, 140b are depicted, only one coil is necessary for the servo valve assembly 100 to operate (e.g. by switching the polarity of the current supplied to the coil the shaft 120 can be moved in either rotational direction). The second coil in the depicted example is used to provide redundancy, in the event the first coil should fail. Although the pair of coils 140a, 140b surround opposing circumferential portions of the shaft 120, any other suitable placement of coils may be used to achieve the operation discussed above within the scope of this disclosure.

Likewise, although the depicted example includes a particular configuration of the driving member 144 for driving shaft rotation (e.g. having permanent magnets 146a, 146b attached to T-shaped ends 144a, 144b) any other suitable geometry and/or arrangement for achieving the generation of the electromagnetic force and rotation of the shaft 120 may be utilised within the scope of this disclosure. For instance, the T-shaped ends 144a, 144b themselves may be made of a permanent magnetic material instead of separate magnets being attached thereto.

With renewed reference to FIGS. 5A and 5B, the shaft 120 is shown rotated to a third position. This third position is a neutral (or null) position, where the amount of occlusion of the first and second outlet openings 116a, 116b from the circumferential surface 121 of the shaft 120 is equal. This position allows equal fluid pressure communication from the supply and return ports 103, 107 to the control port 105.

With renewed reference to FIGS. 2B-2D, 3 and 4, a pair of biasing members 150a, 150b are configured to provide a biasing force that biases the shaft 120 to rotate towards the third position. In the depicted example, the biasing members 150a, 150b are two substantially S-shaped springs 150a, 150b that extend between a first and second end. The springs 150a, 150b provide opposing biasing forces, which act to bias the shaft 120 to rotate towards the third position in both rotational directions. In this manner, the springs 150a, 150b will bias the rotation of the shaft 120 towards the third position, even when the shaft 120 is rotated to the first or second positions by the coils 140a, 140b.

As will be appreciated by the skilled person, as well as enabling the shaft 120 to return towards the neutral (or null) position when required, the force exerted by the biasing members 150a, 150b can be calibrated in combination with the electromagnetic force generated by the coils 140a, 140b to adjust the sensitivity of shaft rotation about the axis of rotation R-R during operation.

The springs 150a, 150b are fixed into the slot 128 at the second axial end of the shaft 120. The springs 150a, 150b contact each other at an interface 151 at the first end of each spring 150a, 150b. The springs 150a, 150b may be secured together and/or to the slot 128 at the interface 151 e.g. by welding, or contact forces between the springs 150a, 150b, interface 151 and the slot 128 may be sufficient to fix the springs 150a, 150b in place in the slot 128, without any connection at the interface 151.

The first and second springs 150a, 150b are also secured at their second end to respective first and second holders 134a, 134b that project from a platform 108a on the housing 108. The holders 134a, 134b surround opposing circumferential portions of the shaft 120 and each define a clevis connection that secures the springs 150a, 150b in place. In this regard, each of the springs 150a, 150b defines a tang 152a, 152b at the second end that passes through a respective clevis 135a, 135b projecting from the holders 134a, 134b. The tang 152a, 152b is secured in the clevis 135a, 135b by a nut 136a, 136b, bolt 137a, 137b and washer 138a, 138b arrangement.

Although the depicted biasing members are two S-shaped springs 150a, 150b, any other suitable geometry, number and/or type of biasing member could be used. For instance, the biasing member could be a single resilient member (e.g. a flat spring) that passes through the shaft 120 and is secured between the holders 134a, 134b. Likewise, although a particular way of fixing the biasing members 150a, 150b to the shaft 120 is depicted (e.g. via the holder 134a, 134b, clevis 135a, 135b and slot 128 etc.) any other suitable method can be used (e.g. welding the biasing members 150a, 150b to the housing 108 and the shaft 120).

Figure 6:
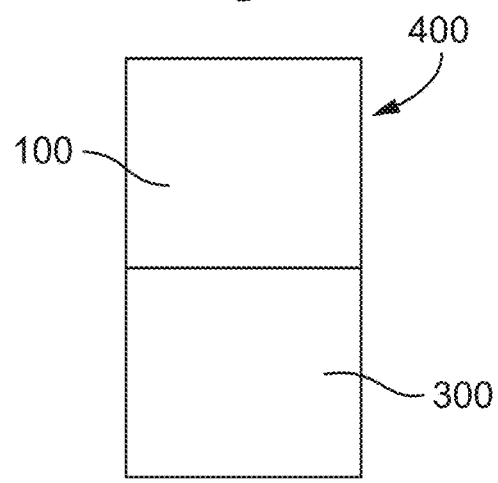
FIG. 6 shows an example of a servo valve comprising the servo valve assembly of FIG. 2A.
Figure 2B:
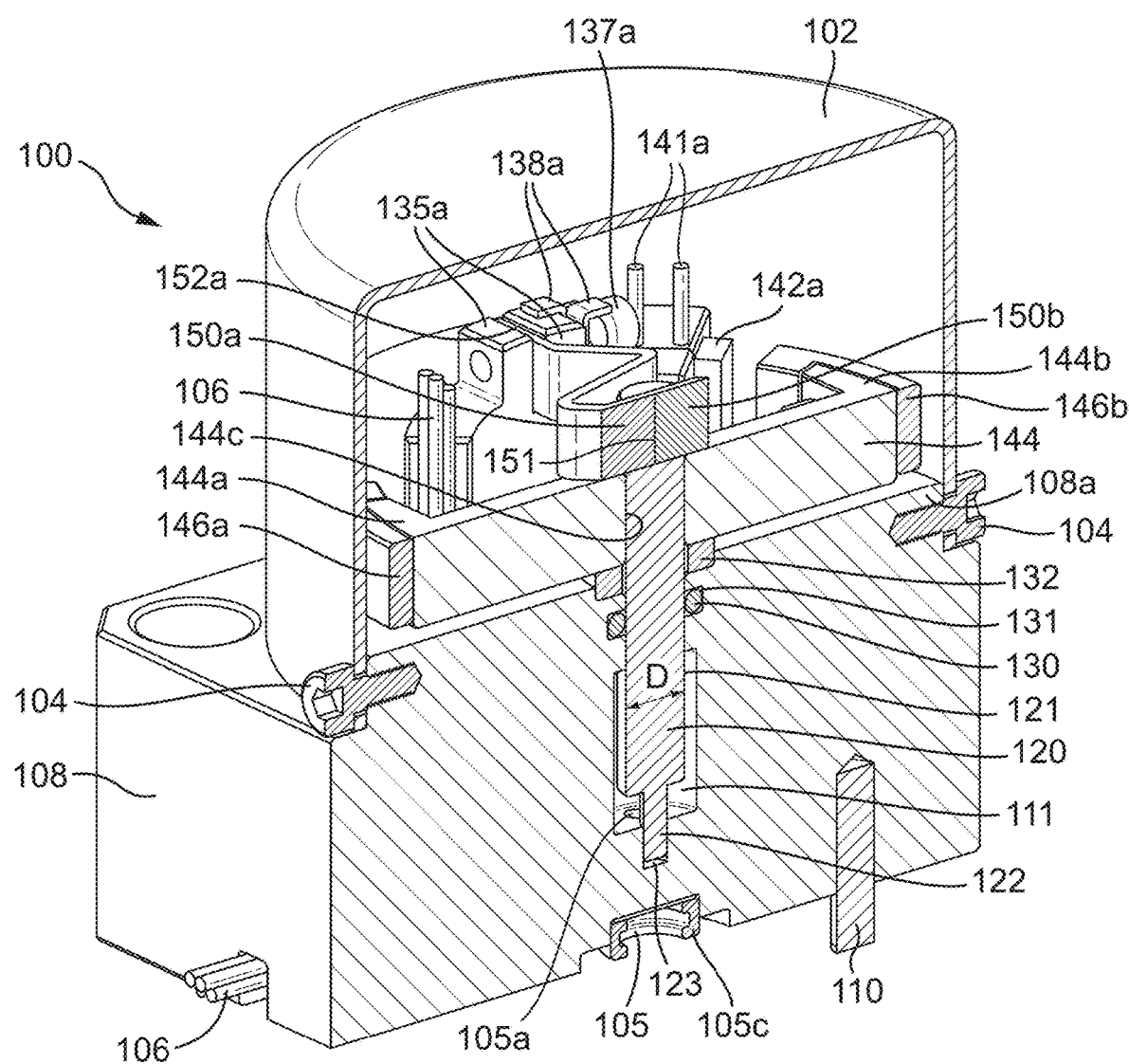
FIG. 2B shows a perspective view of a cross-section through the servo valve assembly of FIG. 2A along line 1-1.
Figure 2C:
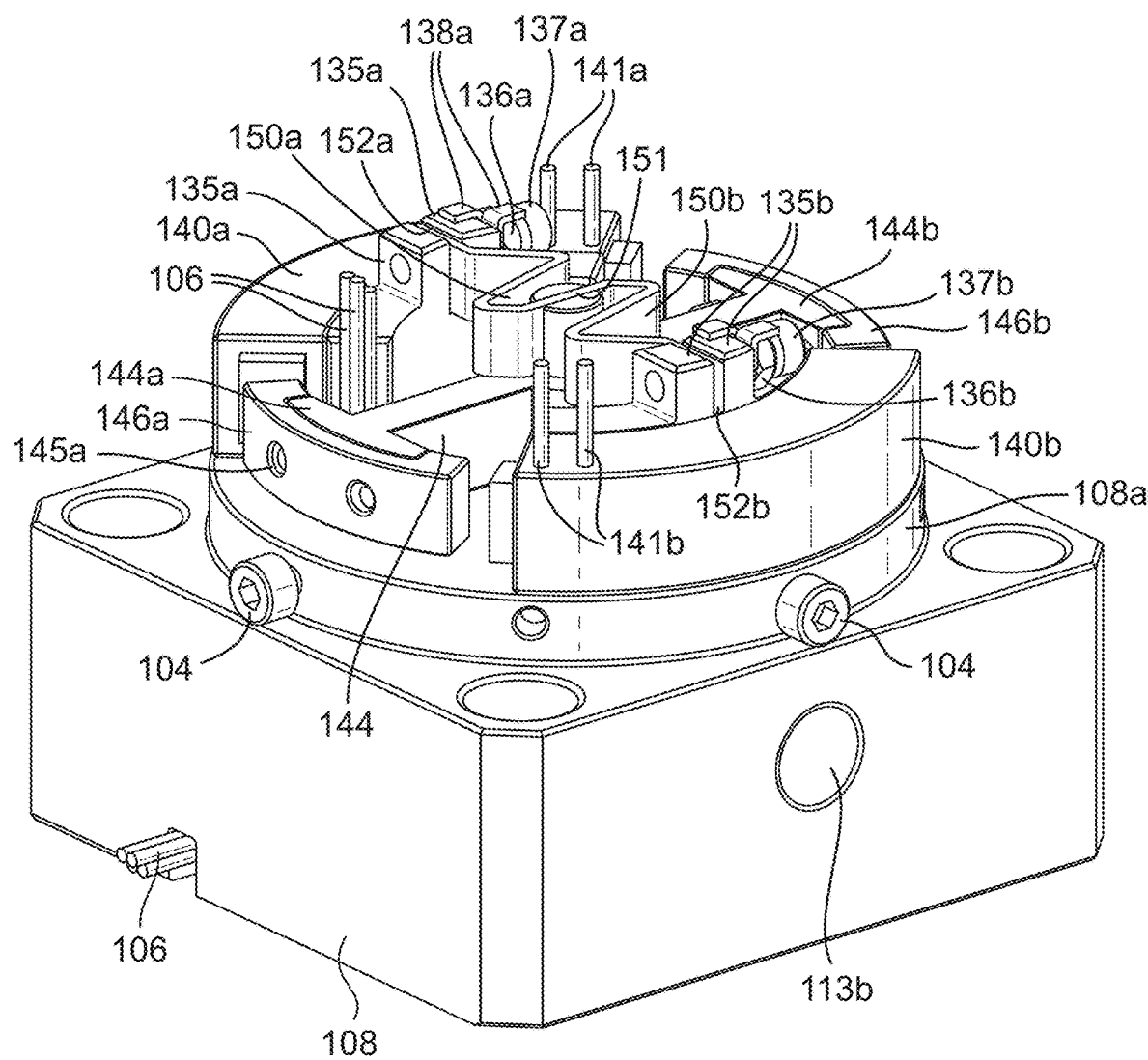
FIG. 2C shows a perspective view of the servo valve assembly of FIG. 2A with the cover removed.
Figure 2D:
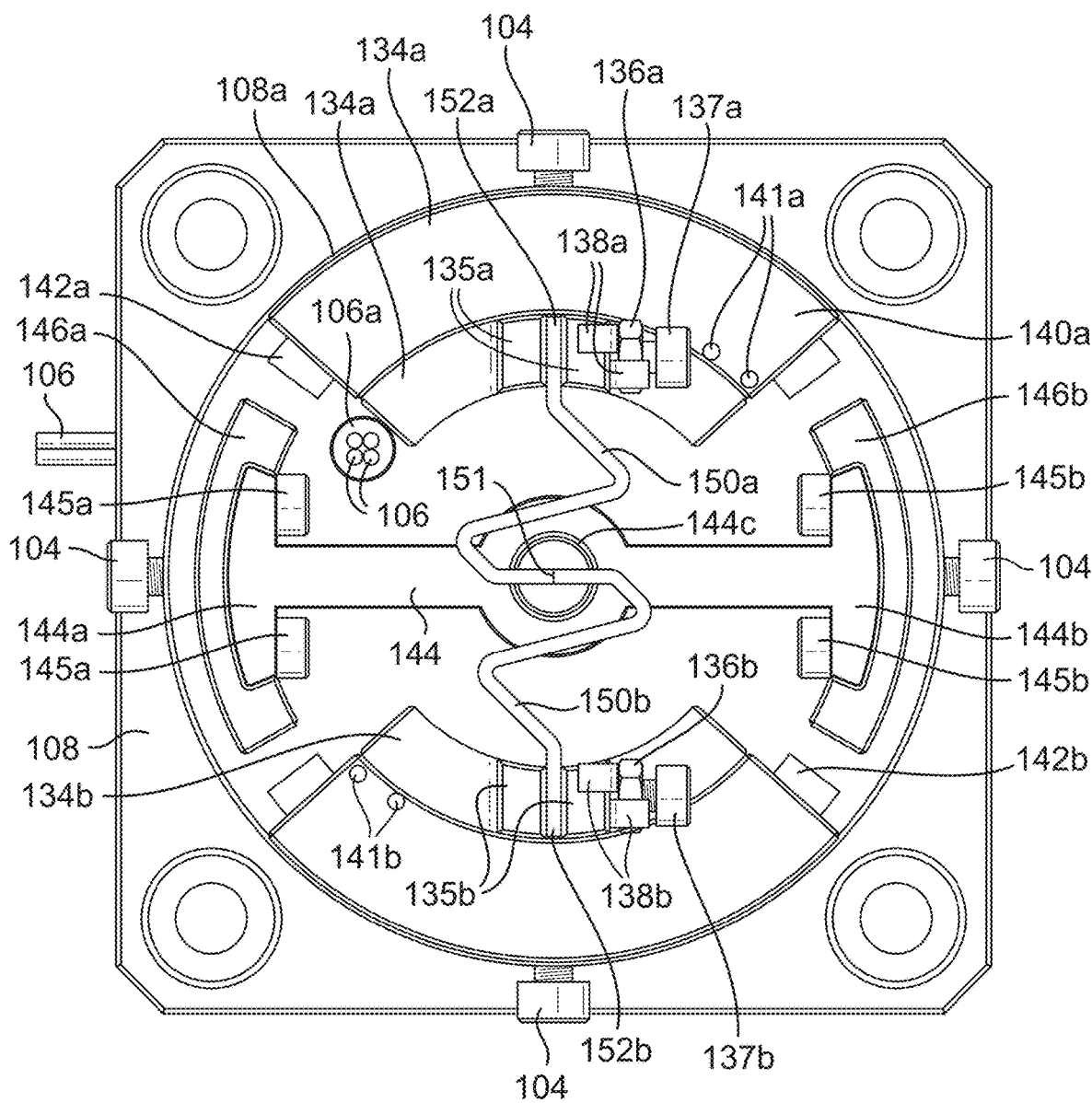
FIG. 2D shows an above view of the servo valve assembly of FIG. 2C.
Figure 3:
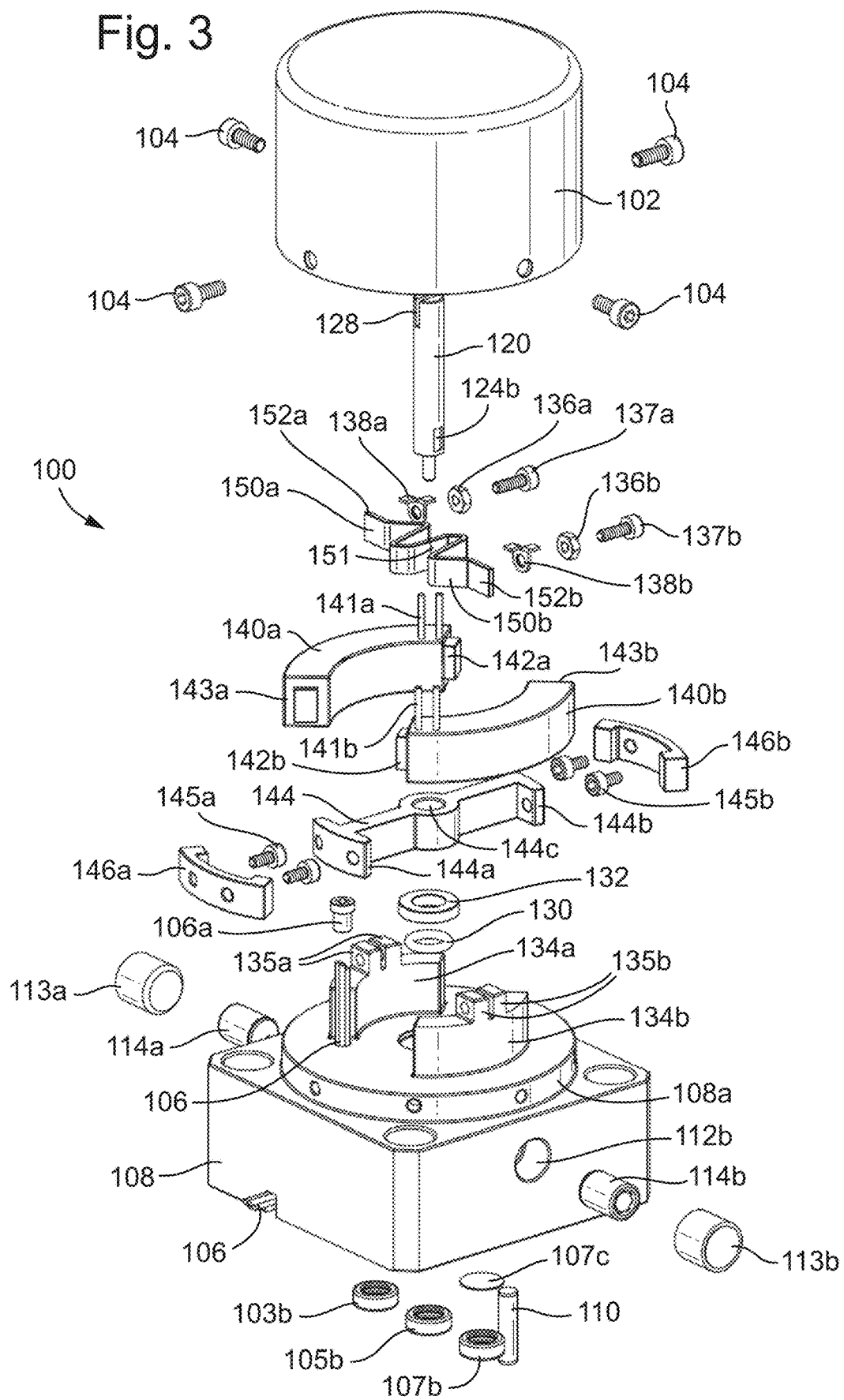
FIG. 3 shows an exploded view of the servo valve assembly of FIG. 2A.
Figure 4:
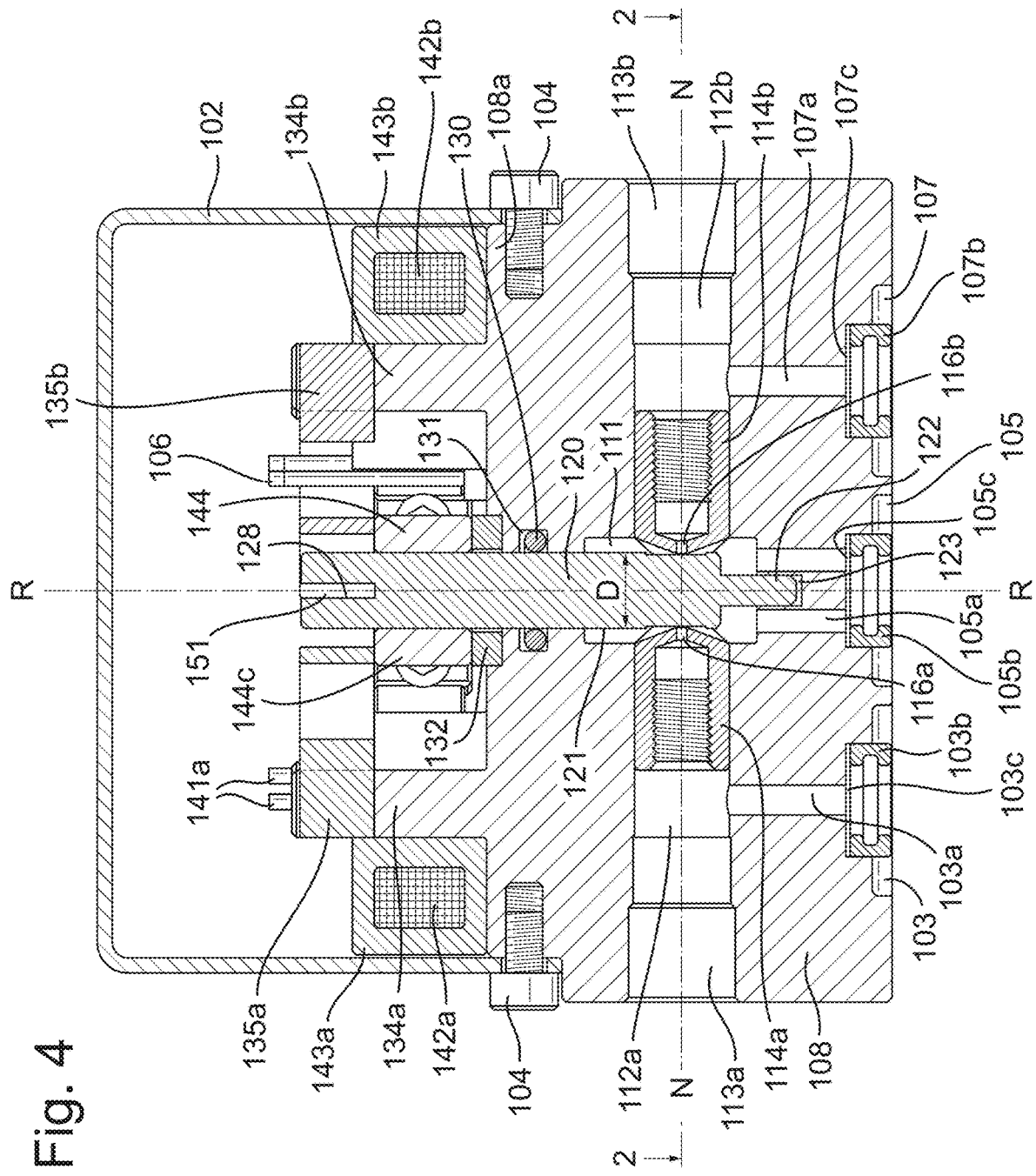
FIG. 4 shows a cross-sectional view of the servo valve assembly of FIG. 2A along line B-B.

With reference to FIG. 6, an example servo valve 400 is depicted in accordance with the present disclosure. The servo valve 400 comprises the servo valve assembly 100 and an actuator arrangement 300 connected downstream thereof. The servo valve assembly 100 is used as a "pilot stage" in the servo valve 400 for controlling movement of the actuator arrangement 300. As is known in the art, the actuator arrangement 300, in addition to or instead of comprising one or more actuators (not shown), may include a spool valve (not shown) to help amplify the movements of the servo valve assembly 100 to provide a suitable actuation force. As discussed above, the servo valve assembly 100 may be separate from the arrangement 300 and connected thereto, e.g. via pin 110, or may be an integral part of the servo valve 400.

The invention claimed is:

1. A servo valve assembly, comprising:
a first nozzle opposing a second nozzle, wherein the first and second nozzles are spaced apart by a gap and each nozzle has an outlet opening; and
a shaft positioned in the gap between the first and second nozzles, wherein:
the shaft defines a diameter (D) and a circumferential surface and is rotatable about an axis of rotation (R-R);
the shaft defines first and second reduced radial portions around its circumferential surface, and the first and second reduced radial portions are in fluid communication with the first and second nozzle outlet openings, respectively;
the shaft is configured to rotate between a first position where the first nozzle outlet opening is more occluded by the shaft circumferential surface than the second nozzle outlet opening, and a second position where the first nozzle outlet opening is less occluded by the shaft circumferential surface than the second nozzle outlet opening;
wherein the first and second reduced radial portions each comprise a groove in the circumferential surface of the shaft; and
wherein the first and second reduced radial portions each comprise a curved surface of continuously decreasing radius that terminates at the groove.

2. The servo valve assembly of claim 1, wherein the axis of rotation (R-R) is perpendicular to a central axis (N-N) of each nozzle outlet opening.

3. The servo valve assembly of claim 1, wherein:
in the first position, the first nozzle outlet opening is fully occluded by the shaft circumferential surface such that the first reduced radial portion is prevented from being in fluid communication therewith, and the second nozzle outlet opening is fully open such that none of the second nozzle outlet opening is occluded by the shaft circumferential surface; and
in the second position, the second nozzle outlet opening is fully occluded by the shaft circumferential surface such that the second reduced radial portion is prevented from being in fluid communication therewith, and the first nozzle outlet opening is fully open such that none of the first nozzle outlet opening is occluded by the shaft circumferential surface.

4. The servo valve assembly of claim 1, further comprising a biasing member configured to provide a biasing force that opposes rotation of the shaft towards a third position where the first nozzle outlet opening and the second nozzle outlet opening are equally occluded by the shaft circumferential surface.

5. The servo valve assembly of claim 4, wherein the shaft further comprises a slot extending along its diameter (D), and the biasing member is received in the slot to apply the biasing force to the shaft.

6. The servo valve assembly of claim 5, wherein the biasing member comprises a pair of S-shaped springs that are fixed in the slot.

7. The servo valve assembly of claim 1, further comprising a coil arranged around at least a portion of the shaft, wherein when the coil is energized the shaft is caused to rotate.

8. The servo valve assembly of claim 7, wherein the shaft further comprises a driving member extending perpendicular to the axis of rotation (R-R).

9. The servo valve assembly of claim 8, wherein the driving member includes a permanent magnet attached thereto to interact with the coil.

10. The servo valve assembly of claim 7, wherein the coil comprises a pair of coils on opposite sides across the diameter (D) of the shaft.

11. A method of controlling the servo valve assembly of claim 7, the method comprising:
applying an electric current to the coil to generate an electromagnetic force that rotates the shaft about the axis of rotation (R-R) in a first rotational direction towards the first position;
reversing the polarity of the electric current; and
applying the reversed polarity electric current to the coil to generate an electromagnetic force that rotates the shaft about the axis of rotation (R-R) in a second rotational direction opposite the first rotational direction towards the second position.

12. A servo valve assembly, comprising:
a first nozzle opposing a second nozzle, wherein the first and second nozzles are spaced apart by a gap and each nozzle has an outlet opening;
a shaft positioned in the gap between the first and second nozzles, wherein:
the shaft defines a diameter (D) and a circumferential surface and is rotatable about an axis of rotation (R-R);
the shaft defines first and second reduced radial portions around its circumferential surface, and the first and second reduced radial portions are in fluid communication with the first and second nozzle outlet openings, respectively; and
the shaft is configured to rotate between a first position where the first nozzle outlet opening is more occluded by the shaft circumferential surface than the second nozzle outlet opening, and a second position where the first nozzle outlet opening is less occluded by the shaft circumferential surface than the second nozzle outlet opening; and a biasing member configured to provide a biasing force that opposes rotation of the shaft towards a third position where the first nozzle outlet opening and the second nozzle outlet opening are equally occluded by the shaft circumferential surface;

wherein the shaft further comprises a slot extending along its diameter (D), and the biasing member is received in the slot to apply the biasing force to the shaft;

wherein the biasing member comprises a pair of S-shaped springs that are fixed in the slot.

\* \* \* \* \*